Jan. 9, 1934.　　　D. McMASTER　　　1,942,869
FILM MAGAZINE CONSTRUCTION
Filed July 24, 1931
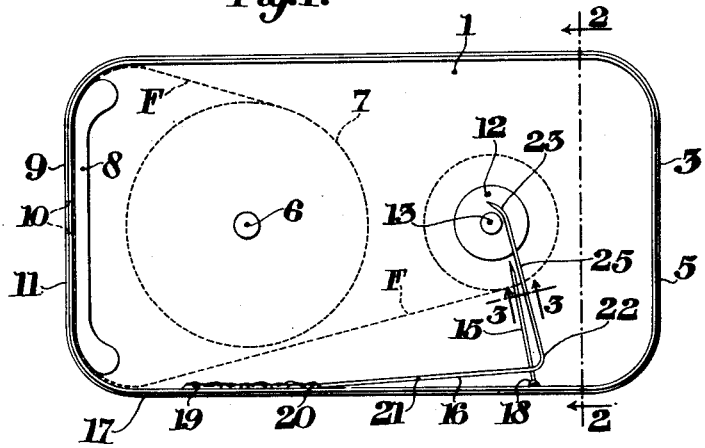
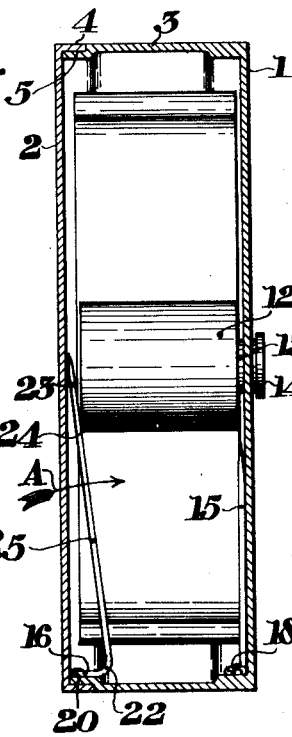
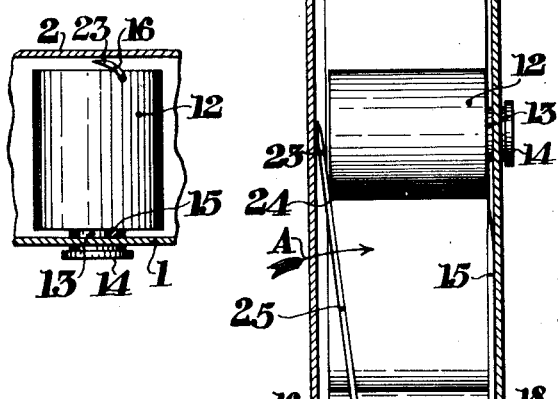
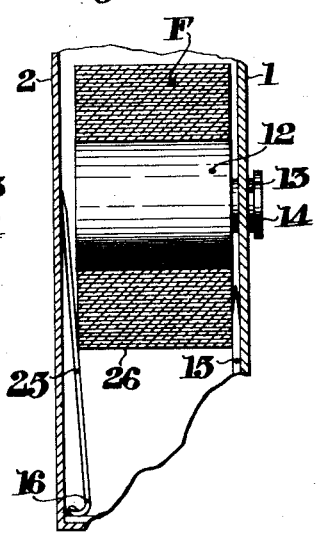
Inventor:
Donald McMaster,
By Newton M. Perrins
Donald H. Stewart,
Attorneys Patented Jan. 9, 1934

1,942,869

UNITED STATES PATENT OFFICE 1,942,869

FILM MAGAZINE CONSTRUCTION

Donald McMaster, Rochester, N. Y., assignor to Eastman Kodak Company, Rochester, N. Y., a corporation of New York Application July 24, 1931. Serial No. 552,914

6 Claims. (Cl. 242—71)

This invention relates to photography and more particularly to magazines in which motion picture film is wound during exposure. One object of my invention is to provide a film magazine with a take-up hub and with a means for causing the successive convolutions of film to wind smoothly upon the take-up hub. Another object of my invention is to provide a take-up hub with a light tensioning spring, the spring being so arranged that it will press on each successive convolution of film as it is wound upon the hub. Another object of my invention is to provide an elongated bent wire spring which is of considerable length and which is bent to provide a light edge tension on film being wound upon the take-up hub. Still another object of my invention is to provide a pair of spaced film guiding members, one fixedly mounted with respect to the magazine and the other fixedly mounted at one end and having an elongated arm which is resilient to press upon film being wound between these two guiding members. A still further object of my invention is to provide a film magazine with a film guide which lies in non-parallel relation to the walls of the magazine and which is resiliently mounted so that a light pressure will always be exerted on the outside convolution of the film being wound upon a take-up hub, and other objects will appear from the following specification, the novel features being particularly pointed out in the claims at the end thereof.

In the drawing wherein like reference characters denote like parts throughout,

Figure 1 is a side elevation of a magazine constructed in accordance with, and embodying, the preferred form of my invention.

Figure 2 is a section on line 2—2 of Figure 1 with the magazine cover in place.

Figure 3 is a section on line 3—3 of Figure 2 and

Figure 4 is an enlarged, fragmentary section showing the relation of the film guiding members and the film when the wind-up hub has received a plurality of convolutions of film thereon.

Broadly speaking, my invention comprises placing a pair of film guides in such a manner that film being wound upon the take-up hub will have the proper alignment without the aid of flanges and with a minimum amount of friction so that the winding action is not retarded to any material extent.

In the embodiment illustrated, the mechanism may consist of two members 1 and 2, which may be connected by complementary edged flanges 3 and 4. Member 1 forms the body of the magazine and the flange 3 extends up around this member to form edge walls for the magazine.

Part 2 is a light-tight cover, the flange 4 of which extends down to a rabbet 5 formed in the upper edge of the flange 3. Thus members 1 and 2 form parallel side walls between which a film F is wound and unwound.

A fixed hub 6 may be provided on magazine section 1, this hub supporting a coil of film 7 which may be termed a supply coil, and which is unexposed. From this coil a film F is led between a rear gate member 8 and a front gate member 9 and is exposed through an exposure aperture indicated by the dotted lines 10 in one wall 11 of the magazine. As thus far described the magazine is of well-known construction. From this gate member the film F is conducted to a take-up hub which may comprise a hub member 12 mounted upon a post 13 which post extends through the wall 1 of the magazine and is provided with a clutch face 14 which may be driven by a source of power carried by the camera in which the magazine is used.

In magazines of this type it is difficult to provide a take-up hub upon which convolutions of film will wind smoothly because the natural tendency of the film is to weave more or less from one side to the other and where this occurs certain convolutions by striking to one side of the normal film path may bind upon the parallel side walls 1 and 2. If this occurs the friction frequently becomes so great that the take-up hub cannot satisfactorily wind a film thereon.

In order to overcome these difficulties I have provided a pair of film guiding members. In a preferred embodiment of my invention these guiding members may consist of two wires 15 and 16. Wire 15 is comparatively short and extends up from a lower wall 17 of the magazine lying flat against the wall 1, while this wire is shown as being attached by a lump of solder at 18 the length of the wire is such that it does not spring and for the purposes of the invention may be regarded as being fixed.

Wire 16, on the other hand, is of considerable length. I prefer to make it longer than the edges of the magazine to increase the resiliency, although this is not necessary. As shown in Figure 1, the wire 16 may be attached, as by solder 19 to a convenient portion of the magazine or cover and is here shown as being attached to the edged flange 17 of the magazine. The remainder of the wire is movable. From a point about 20 the wire is bent slightly downwardly so that a length 21 extends toward the wall 1 of the magazine to a point 22 where the wire is sharply bent so that the free end 23 may lie above a portion of the take-up hub 12. There is a normal tendency for the spring arm 23 to exert a pressure downwardly in the direction shown by the arrow A in Figure 2. As will also be seen in this figure, the shape of the spring causes it to press lightly upon one edge 24 of the periphery of the winding hub.

This spring has been found convenient for several reasons. In the first place the arm 25 is adapted to have edged contact with the film F, as it approaches the take-up hub and is wound in a coil thereon. The arm 25 lies substantially radially of the hub 13 and in this position, as successive convolutions of the film are wound upon the hub, the outer convolution, as indicated in Figure 4 at 26 has edge contact with the spring arm 25. This presses the edge of convolutions 26 lightly against the fixed wire guide 15 and, consequently, a perfectly even coil of film F is wound upon the hub 12.

At the same time the tension upon the spring arm 25 is so light that scarcely any friction results and the mechanism has no difficulty in winding the film upon the take-up hub 12. As will be seen from Figure 4, as the size of the film convolutions on hub 12 increases, the spring wire at point 22 will gradually approach the wall 2 as the edge contact with the outer convolution of the film moves further from the hub 12. Thus, while the arm 25 of the spring 16 normally lies at an angle to the parallel walls 1 and 2 of the magazine, when the take-up hub is full of film this arm may lie very near to these walls and irrespective of the size of the coil of film wound on hub member 12, the outer convolution 26 always is in contact with a portion of the spring arm 25.

In the preferred embodiment of my invention illustrated I have employed light spring wire for the movable film guide. Quite obviously, this film guiding member could be made of thin sheet stock if desirable, and it is also obvious that the fixed film guiding member 15 could readily be made by forming a ridge in the base 1 of the magazine.

While I have described a preferred embodiment of my invention, I contemplate as within the scope of my invention all such forms as may come within the terms of the appended claims.

Having thus described my invention, what I claim as new and desire to secure by Letters Patent is:

1. In a film magazine having rectangular sides connected by edge flanges, the combination with a film winding hub, of means for directing film smoothly thereto comprising a light bent spring film guiding member attached to a wall of the magazine, a portion of said spring having contact with the edge of an outer convolution of film wound on said hub, said bent spring member being of greater length than at least one side of the rectangular magazine, and a second film guiding member fixedly carried by the magazine and spaced from the light spring.

2. In a film magazine, the combination, with a film winding hub, of means for directing film smoothly thereon comprising a pair of film guiding members one fixedly mounted and the other fixedly attached at one end only, said last mentioned member comprising springy material normally lying toward the first mentioned guide so as to be spaced therefrom a distance less than the normal width of a film whereby said guide may contact with the outermost coil of film wound on the film winding hub.

3. In a film magazine, the combination, with a film winding hub, of means for directing film smoothly thereon comprising a pair of film guiding members one fixedly mounted and the other fixedly attached at one end only, said last mentioned member comprising a resilient member having a normal position in which it is inclined toward the first mentioned fixedly mounted film guide, and capable of being moved from this position by a film passing between said guides.

4. In a film magazine, the combination with a film winding hub of means for directing film convolutions smoothly on a hub including two guides, one attached to the bottom of the magazine and the other spaced from the first having a relatively long arm, one end of which is attached to a wall of the magazine, the other end of said long arm being adapted to normally contact with the hub, and to have edge contact with convolutions of film wound thereon whereby each convolution may be resiliently pressed down upon the fixed wire and all the film convolutions may be evenly guided into place.

5. In a film magazine including two side walls spaced apart by flanges, the combination with a film winding hub revolubly supported in a magazine by a side wall, of means for directing film to the hub comprising a single light spring member attached to a flange and having a portion normally contacting with said hub and a portion lying in non-parallel relation to the spaced side walls of said magazine whereby said light spring member may have edge contact with each successive film convolution wound on said hub, and, as the diameter of the film convolutions on the hub increases said light spring may nearly approach a parallel relation to said spaced side walls of said magazine.

6. In a film magazine including parallel side walls connected by edge flanges, the combination with a take-up hub, of means for directing film convolutions smoothly thereto including a single light spring arm attached to an edge flange and extending from such flange to said hub, said light spring having a bend between its ends whereby said spring is adapted to contact with the take-up hub at one end, and to be spaced from the parallel side walls a distance less than the normal width of a film at a point spaced from the hub, whereby said spring may have edge contact with convolutions of film wound on said hub.

DONALD McMASTER.